US011697571B2

(12) United States Patent
Wang et al.

(10) Patent No.: US 11,697,571 B2
(45) Date of Patent: Jul. 11, 2023

(54) END-TO-END COGNITIVE ELEVATOR DISPATCHING SYSTEM

(71) Applicant: International Business Machines Corporation, Armonk, NY (US)

(72) Inventors: Wen Wang, Beijing (CN); Rong Fu, Ningbo (CN); Zhuo JP Cai, Beijing (CN); Hao Sheng, Zhejiang (CN); Jian Dong Yin, Beijing (CN); Kang ED Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1290 days.

(21) Appl. No.: 16/174,869

(22) Filed: Oct. 30, 2018

(65) Prior Publication Data

US 2020/0130984 A1 Apr. 30, 2020

(51) Int. Cl.
*B66B 1/24* (2006.01)
*G05B 13/04* (2006.01)
*G05B 13/02* (2006.01)
*B66B 5/00* (2006.01)
*B66B 1/46* (2006.01)

(52) U.S. Cl.
CPC ............ *B66B 1/2458* (2013.01); *B66B 1/468* (2013.01); *B66B 5/0012* (2013.01); *G05B 13/027* (2013.01); *G05B 13/048* (2013.01); *B66B 2201/20* (2013.01); *B66B 2201/235* (2013.01); *B66B 2201/243* (2013.01); *B66B 2201/402* (2013.01); *B66B 2201/403* (2013.01); *B66B 2201/4638* (2013.01); *B66B 2201/4653* (2013.01)

(58) Field of Classification Search
CPC ..... B66B 1/2458; B66B 1/468; B66B 5/0012; B66B 2201/20; B66B 2201/235; B66B 2201/243; B66B 2201/402; B66B 2201/403; B66B 2201/4638; B66B 2201/4653; G05B 13/027; G05B 13/048
See application file for complete search history.

(56) References Cited

U.S. PATENT DOCUMENTS 4,838,384 A * 6/1989 Thangavelu .......... B66B 1/2458
 187/385
5,612,519 A * 3/1997 Chenais ................ B66B 1/2458
 187/382

(Continued)

FOREIGN PATENT DOCUMENTS

CN 105293224 A 2/2016
CN 106494953 A 3/2017

(Continued)

*Primary Examiner* — Jeffrey Donels
(74) *Attorney, Agent, or Firm* — Yee & Associates, P.C.

(57) ABSTRACT

A method and system for controlling elevator dispatch is provided. User data, including user behavior, is collected from a number of users over a specified time period. Elevator use data for a number of elevators in a building is also collected over the specified time period. Applying the user data and elevator use data, an elevator dispatch model is constructed that predicts future elevator use according to predicted user needs. An elevator control system dispatches the elevators according to the dispatch model. The elevator dispatch model is refined according to feedback data collected from users over a subsequent time period.

20 Claims, 5 Drawing Sheets

(56) References Cited

U.S. PATENT DOCUMENTS

| | | | | |
|---|---|---|---|---|
| 5,750,946 A * | 5/1998 | Thangavelu | ........... | B66B 1/2458 |
| | | | | 187/382 |
| 5,841,084 A * | 11/1998 | Thangavelu | ........... | B66B 1/2458 |
| | | | | 187/382 |
| 6,325,178 B2 * | 12/2001 | Hikita | ................... | B66B 1/2458 |
| | | | | 187/382 |
| 6,672,431 B2 * | 1/2004 | Brand | ................... | B66B 1/2458 |
| | | | | 187/382 |
| 7,711,565 B1 * | 5/2010 | Gazdzinski | ............. | B66B 1/468 |
| | | | | 369/30.01 |
| 9,896,305 B2 * | 2/2018 | Blandin | ................. | B66B 1/3461 |
| 11,232,312 B2 * | 1/2022 | Chen | ......................... | G06T 7/50 |
| 2016/0292522 A1 * | 10/2016 | Chen | .................... | B66B 1/3476 |
| 2016/0297642 A1 * | 10/2016 | Finn | ...................... | B66B 1/3476 |
| 2017/0369275 A1 * | 12/2017 | Saraswat | ................ | B66B 1/3407 |
| 2018/0290859 A1 * | 10/2018 | Barajas Gonzalez | .... | G06N 5/04 |
| 2020/0130983 A1 * | 4/2020 | Karve | ................... | B66B 1/2458 |

FOREIGN PATENT DOCUMENTS

| | | | | |
|---|---|---|---|---|
| EP | 565864 A1 * | 10/1993 | ........... | B66B 1/2408 |
| EP | 0565864 A1 * | 10/1993 | ........... | B66B 1/2408 |
| GB | 2246210 A * | 1/1992 | ........... | B66B 1/2408 |

* cited by examiner

END-TO-END COGNITIVE ELEVATOR DISPATCHING SYSTEM

BACKGROUND

The disclosure relates generally to control systems, and more specifically to a method and system for controlling the dispatch of elevators in a building according to user needs.

Elevators play an important role in daily trips, especially for resident-intensive apartments and office buildings. An efficient elevator dispatching system is necessary to save time for users and reduce elevator running costs for related units. Currently, there is much research on optimizing elevator running paths based on current traffic. Some elevator dispatching systems can arrange elevators for waiting users in real-time, and have already been used in some advanced apartments and office buildings. However, current systems face several challenges. These systems can only arrange/plan optimizing elevator dispatch for newly arrived users. This dispatching is based on current traffic, without taking future traffic into consideration. Present systems only take traffic into consideration, without understanding users' requirements such as trip purpose and preference on elevator environments. These systems are also closed and have no interaction with users and, thus, cannot collect feedback and improve the dispatching system automatically.

SUMMARY

A method of controlling elevator dispatch. The method comprises collecting, by a number of input devices, user data from a number of users, wherein the user data includes user behavior over a specified time period. Elevator use data is collected by an elevator control system for a number of elevators in a building over the specified time period. Applying the user data and elevator use data, an elevator dispatch model is constructed that predicts future elevator use according to predicted user needs. The elevator control system dispatches the elevators according to the dispatch model. The elevator dispatch model is then refined according to feedback data collected from users over a subsequent time period.

A system for controlling elevator dispatch, comprising: a bus system; a storage device connected to the bus system, wherein the storage device stores program instructions; and a number of processors connected to the bus system, wherein the processors execute the program instructions to: collect user data from a number of users, wherein the user data includes user behavior over a specified time period; collect elevator use data for a number of elevators in a building over the specified time period; construct, by applying the user data and elevator use data, an elevator dispatch model that predicts future elevator use according to predicted user needs; dispatch the elevators according to the dispatch model; and refine the elevator dispatch model according to feedback data collected from users over a subsequent time period.

A system for controlling elevator dispatch that comprises an elevator control system configured to control movements of a number of elevators in a building and collect data about elevator use. A bus system is in communication with the elevator control system as well as an input system, wherein the input system is configured to receive data from a number of input devices. A storage device connected to the bus system is configured to store input data and program instructions A number of processors connected to the bus system execute the program instructions to: collect user data provided by the input system about a number of users, wherein the user data includes user behavior over a specified time period; collect elevator use data for the elevators in the building over the specified time period; construct, by applying the user data and elevator use data, an elevator dispatch model that predicts future elevator use according to predicted user needs; dispatch the elevators in the building according to the dispatch model; and refine the elevator dispatch model according to user feedback data provided by the input system over a subsequent time period.

A computer product for controlling elevator dispatch comprises a non-volatile computer readable storage medium having program instructions embodied therewith. The program instructions are executable by a computer to cause the computer to perform the steps of: collecting user data from a number of users, wherein the user data includes user behavior over a specified time period; collecting elevator use data for a number of elevators in a building over the specified time period; constructing, by applying the user data and elevator use data, an elevator dispatch model that predicts future elevator use according to predicted user needs; dispatching the elevators according to the dispatch model; and refining the elevator dispatch model according to feedback data collected from users over a subsequent time period.

DETAILED DESCRIPTION

Aspects of the present invention are described herein with reference to diagrams of methods and apparatuses according to embodiments of the invention. The diagrams in the Figures illustrate the architecture and operation of possible implementation methods according to various embodiments of the present invention.

The illustrative embodiment provide a new method to build a real-time elevator dispatching system based on users' information that are registered with the elevator local area network. The present disclosure is aimed at elevator networks in apartment or office buildings with relative high resident or employee traffic.

Illustrative embodiments provide a local area network for elevators in a building. Users can connect to the network using applications, input devices, and other sensors. In addition to information related to elevators, information of registered users and some external conditions like weather are also collected by the network. The users' information includes basic information like gender, height, weight, career and some trip-relative behaviors like the regular trip time, or trip preference. All of the above information is combined to build a real-time predictive model for the dispatching system. The system can predict elevator traffic in the near future, and identify users' trip intent and preferences, which are also taken into consideration by the system. Feedback is collected from users and used to automatically refine the dispatching model. Using historical and real-time data, the dispatch model is based on current traffic, predicted future traffic, user features, and user preferences.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 1:
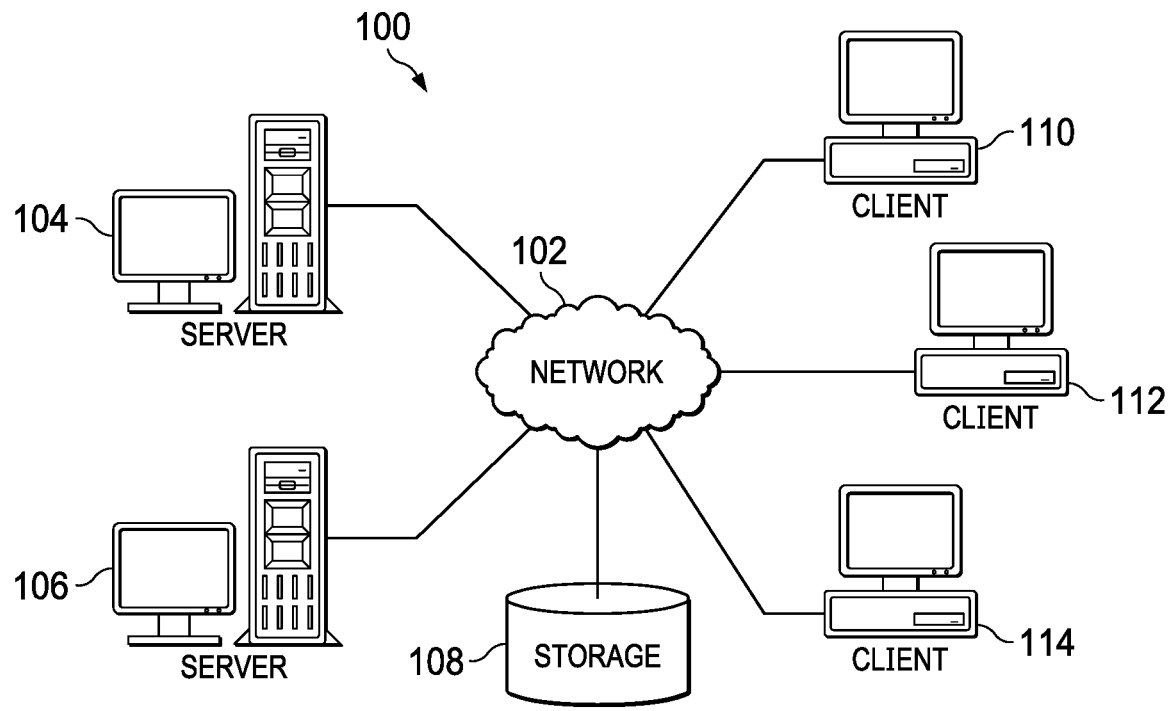
FIG. 1 depicts a pictorial representation of a network of data processing systems in which illustrative embodiments can be implemented.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include user names, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Figure 2:
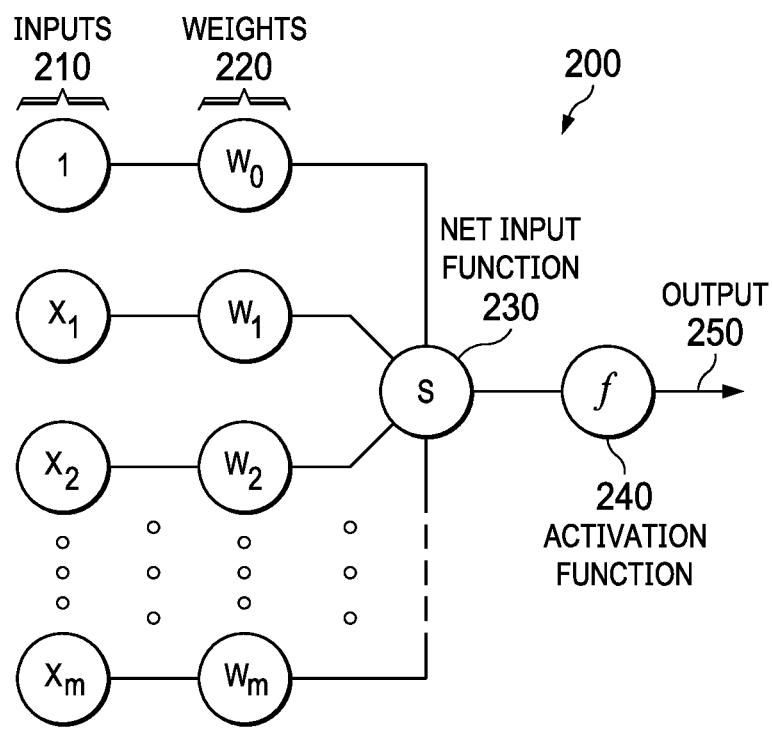
FIG. 2 is a diagram that illustrates a node in a neural network in which illustrative embodiments can be implemented.

FIG. 2 is a diagram that illustrates a node in a neural network in which illustrative embodiments can be implemented. Node 200 combines multiple inputs 210 from other nodes. Each input 210 is multiplied by a respective weight 220 that either amplifies or dampens that input, thereby assigning significance to each input for the task the algorithm is trying to learn. The weighted inputs are collected by a net input function 230 and then passed through an activation function 240 to determine the output 250. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Stochastic neural networks are a type of network that incorporate random variables, which makes them well suited for optimization problems. This is done by giving the nodes in the network stochastic (randomly determined) weights or transfer functions. A Boltzmann machine is a type of stochastic neural network in which each node is binary valued, and the chance of it firing depends on the other nodes in the network. Each node is a locus of computation that processes an input and begins by making stochastic decisions about whether to transmit that input or not. The weights (coefficients) that modify inputs are randomly initialized.

Boltzmann machines optimize weights and quantities and are particularly well suited to represent and solve difficult combinatorial problems. To solve a learning problem, a Boltzmann machine is shown a set of binary data vectors and must find weights on the connections so that the data vectors are good solutions to the optimization problem defined by those weights.

Figure 3:
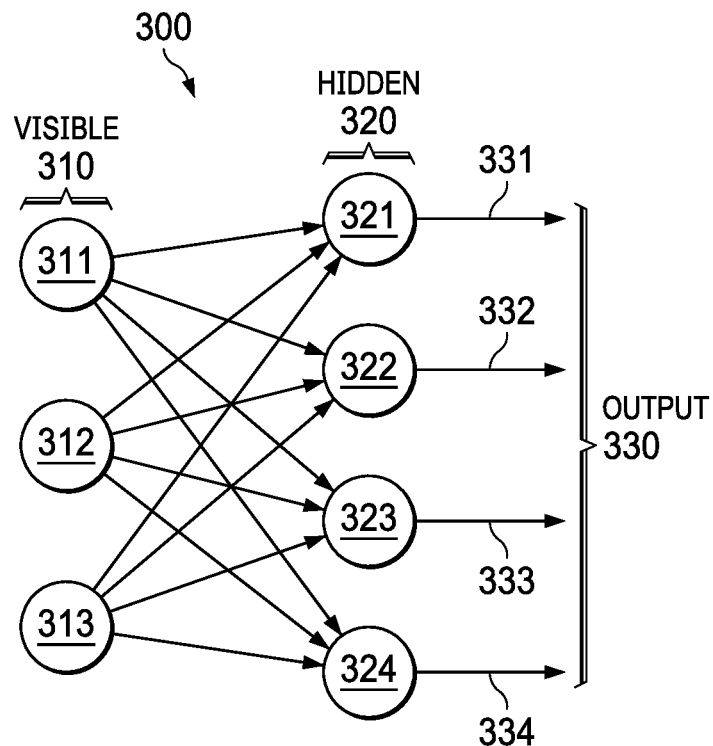
FIG. 3 is a diagram illustrating a restricted Boltzmann machine in which illustrative embodiments can be implemented.

FIG. 3 is a diagram illustrating a restricted Boltzmann machine in which illustrative embodiments can be implemented. As shown in FIG. 3, the nodes in the Boltzmann machine 300 are divided into a layer of visible nodes 310 and a layer of hidden nodes 320. A common problem with general Boltzmann machines is that they stop learning correctly when they are scaled up. Restricted Boltzmann machines (RBMs) overcome this problem by using an architecture that does not allow connections between nodes in the same layer. As can be seen in FIG. 3, there is no intralayer communication between nodes.

The visible nodes 310 are those that receive information from the environment (i.e. a set of external training data). Each visible node in layer 310 takes a low-level feature from an item in the dataset and passes it to the hidden nodes in the next layer 320. When a node in the hidden layer 320 receives an input value x from a visible node in layer 310 it multiplies x by the weight assigned to that connection (edge) and adds it to a bias b. The result of these two operations is then fed into an activation function which produces the node's output.

In symmetric networks such as Boltzmann machine 300, each node in one layer is connected to every node in the next layer. For example, when node 321 receives input from all of the visible nodes 311-313 each x value from the separate nodes is multiplied by its respective weight, and all of the products are summed. The summed products are then added to the hidden layer bias, and the result is passed through the activation function to produce output 331. A similar process is repeated at hidden nodes 322-324 to produce respective outputs 332-334. In the case of a deeper neural network (discussed below), the outputs 330 of hidden layer 320 serve as inputs to the next hidden layer.

Training a Boltzmann machine occurs in two alternating phases. The first phase is the "positive" phase in which the visible nodes' states are clamped to a particular binary state vector sampled from the training set (i.e. the network observes the training data). The second phase is the "negative" phase in which none of the nodes have their state determined by external data, and the network is allowed to run freely (i.e. the network tries to reconstruct the input). In the negative reconstruction phase the activations of the hidden layer 320 act as the inputs in a backward pass to visible layer 310. The activations are multiplied by the same weights that the visible layer inputs were on the forward pass. At each visible node 311-313 the sum of those products is added to a visible-layer bias. The output of those operations is a reconstruction r (i.e. an approximation of the original input x).

On the forward pass, the RBM uses inputs to make predictions about node activations (i.e. the probability of output given a weighted input x). On the backward pass, the RBM is attempting to estimate the probability of inputs x given activations a, which are weighted with the same coefficients as those used on the forward pass. The bias of the hidden layer helps the RBM to produce activations on the forward pass. Biases impose a floor so that at least some nodes fire no matter how sparse the input data. The visible layer bias helps the RBM learn the reconstructions on the backward pass.

Because the weights of the RBM are randomly initialized the difference between the reconstructions and the original inputs is often large. That error is then backpropagated against the RBM's weights in an iterative learning process, and the weights are adjusted until an error minimum is reached.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

As mentioned above, RBMs can be stacked to created deep networks. After training one RBM, the activities of its hidden nodes can be used as training data for a higher level RBM, thereby allowing stacking of RBMs. Such stacking makes it possible to efficiently train several layers of hidden nodes.

Examples of deep networks with which illustrative embodiments can be implemented include, without limitation, Deep Boltzmann Machines (DBM), Deep Belief Networks (DBN), Recurrent Neural Networks (RNN), and Spiking Neural Networks (SNN).

Figure 4:
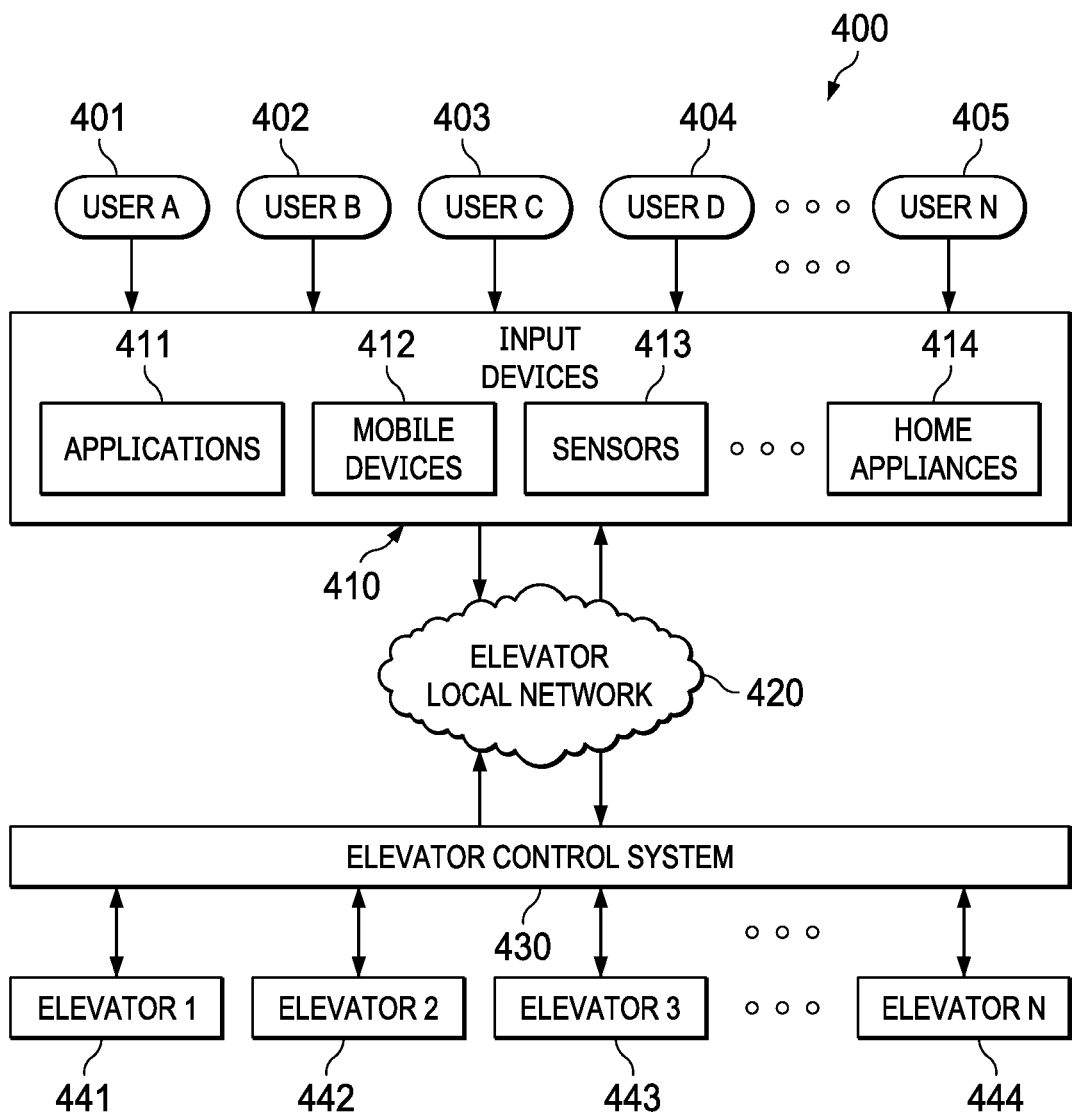
FIG. 4 depicts an architecture for an elevator dispatch system in which illustrative embodiments can be implemented.

FIG. 4 depicts an architecture for an elevator dispatch system 400 in which illustrative embodiments can be implemented. The elevator dispatch system 400 comprises a number of input devices 410 that are capable of collecting user data and preferences from a number of different users 401-405. The input devices 410 can include special applications 411 running on a variety of devices, mobile devices 412 such as mobile phones, tablet computers, smart watches. Other examples include sensors 413, which might be placed on the outside and in corridors of buildings, near or in elevators, as well as within offices or apartments. The sensors 413 can comprise cameras, facial recognition sensors (explained in more detail below), and motion sensors. The input devices can also comprise internet enabled home appliances (e.g., light switches, stoves, refrigerators, coffee machines, etc.) 414 that provide information (with user permission of course) regarding user behavior and activity within the user's apartment or office, which can help to predict when that user will likely need an elevator and with what urgency (e.g., rushing to work in the morning, trying to beat rush hour traffic at the end of the day, etc.).

Data from the input devices 410 is fed to an elevator local network 420. The network 420 might comprise network 100 in FIG. 1. It can also comprise one or more neural networks similar to neural network 300 depicted in FIG. 3.

Elevator control system 430 both controls the movement of elevators 441-444 in the building as well as collects historical and real-time data regarding elevator use and traffic patterns.

Figure 5:
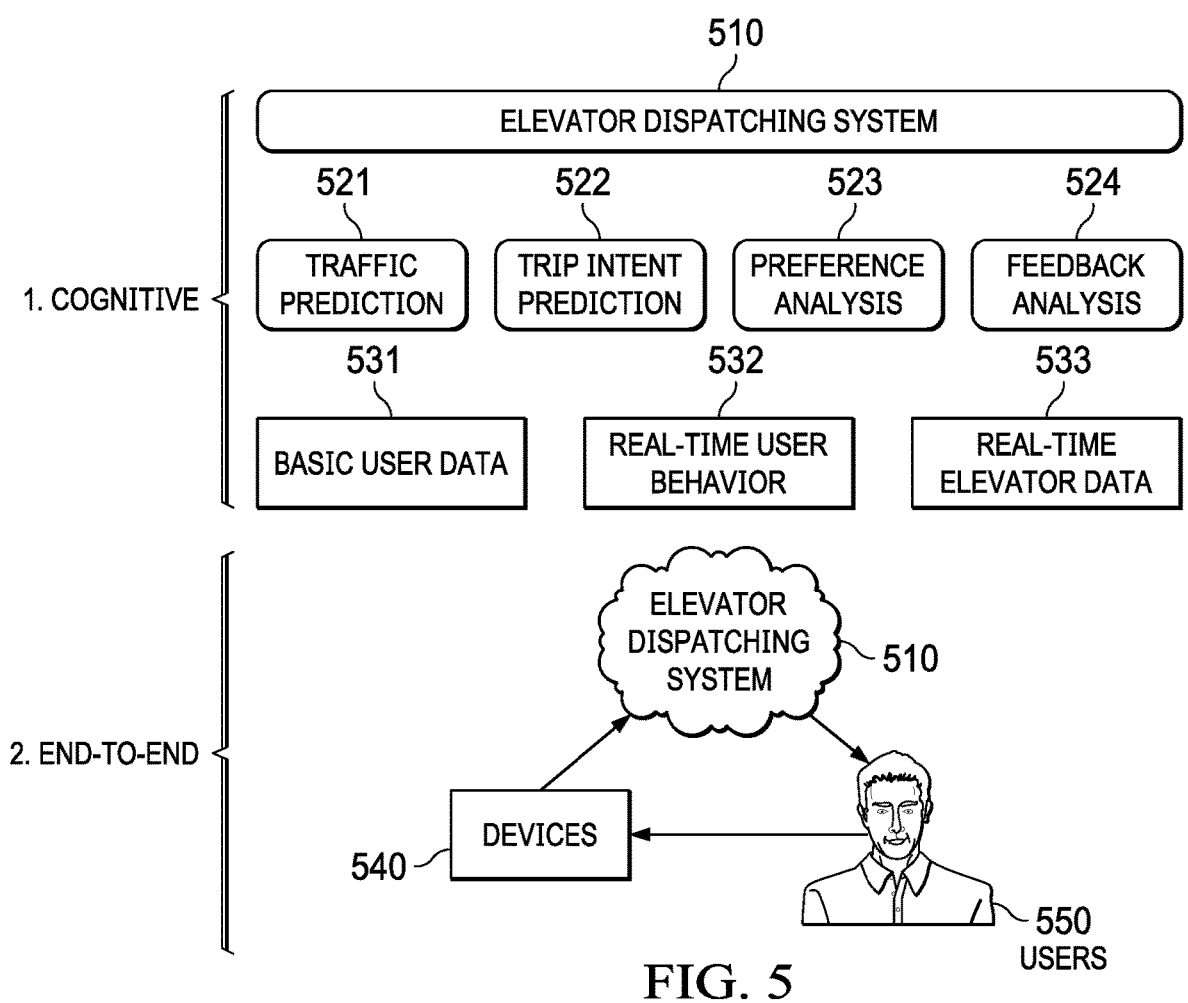
FIG. 5 is a diagram depicting cognitive elements and operational implementation that can be employed with illustrative embodiments.

FIG. 5 is a diagram depicting cognitive elements and operational implementation that can be employed with illustrative embodiments. The elevator dispatching system 510 can comprise the elevator local network 420 and elevator controller 430 shown in FIG. 4. It is responsible for constructing, implementing, and updating and refining the predictive elevator dispatch model.

The raw data used to construct the predictive model comprises basic user data 531, real-time user behavior 532, and real-time elevator use data 533. This raw data can be collected by the input devices 410 and elevator control system 430 in FIG. 4.

Basic user data 531 can comprise height, weight, gender, age, and the floor on which the user lives or works. These data can help determine the user's physical needs in terms of elevator use.

Real-time user behavior 532 can comprise behavior such as turning lights on or off (e.g., in bedroom, bathroom, kitchen, office, etc.), opening a door, closing a door, and/or other factors that contribute to the timing of when that user will likely be arriving at the elevator. Other examples of real-time behavior include carrying a piece of luggage/box, pushing a baby-car, using a mobile phone, etc.

The raw data is analyzed according to different factors affecting elevator use. These include prediction of overall user traffic 521, predictions regarding the intended purpose of an elevator trip 523, and analysis of feedback data 524. These cognitive dimensions are used as inputs by the predictive dispatch model during normal operation as well as in the construction and refinement of the model itself through the identification of recurring and changing patterns of use.

Future traffic prediction 521 comprises determining when users will need the elevators. For example, two users on the $12^{th}$ floor of a building are closing their doors and are expected to arrive at the elevator bank in 30 second, one user on the $20^{th}$ floor turned off the lights to his apartment or office and is expected on the elevator(s) in 50 seconds. Meanwhile a user on the $8^{th}$ floor is about to leave her apartment with a baby carriage and is predicted to arrive that the elevator in 40 seconds. This type of real-time data can also be combined with historical data regarding normal schedules of registered users.

User preference analysis attempts to predict user needs according to basic user data 531 and real-time behavior 532. For example someone who is larger than most other users will require more space within an elevator and therefore should preferably not be placed on a crowded elevator. The age of a user can affect ambulatory speed, which can be used by the dispatch model to predict when that person is likely to arrive at the elevator bank. If someone is carrying a package or pushing a cart it will affect not only the speed with which the user will reach the elevator but also the amount of space the user will need on the elevator, and the speed with which the user will exit the elevator. In the case of biometric sensors (e.g., on a smart watch, pedometer), the user's current movement speed and heart rate (e.g., in a rush) can be used to indicate urgency and priority in dispatching an elevator.

In other cases, user preference might have more to do with factors other than speed. For example, if the user is in the middle of a call on a mobile phone, the dispatch system might not dispatch a crowded elevator to that user, who requires a quiet environment and privacy, even if that means waiting longer for an elevator.

Feedback analysis 524 allows the system to continually refined and improve the accuracy of the predictive dispatch model. At the end-to-end operational level, the elevator dispatch system 510 operates in a continuous loop of receiving data from users 550 via a number of input devices 540 and then refining the dispatching model to meet user needs. The feedback can be provided directly from users such as a score from a questionnaire or other direct feedback system. Indirect feedback can also be collected from users such as body language and micro facial expressions given by users when taking the elevator, as determined by facial recognition sensors and software.

Figure 6:
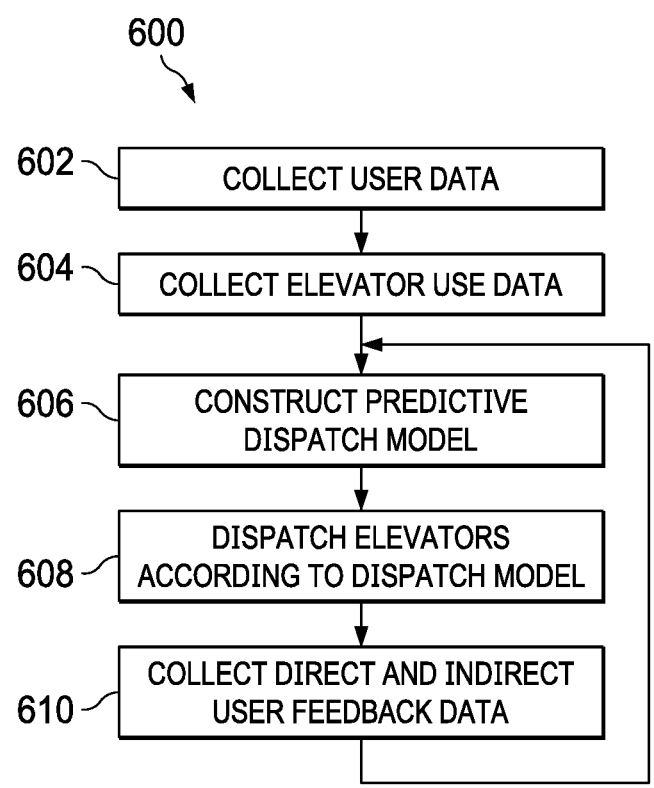
FIG. 6 is a flowchart depicting the operation of an elevator dispatch system in which illustrative embodiments can be implemented.

FIG. 6 is a flowchart depicting the operation of an elevator dispatch system in which illustrative embodiments can be implemented. Process 600 begins by collecting user data via a number of input devices (step 602). Elevator use data is collected by the elevator control system (step 604).

The user data and elevator use data are used to construct a predictive elevator dispatch model that predicts user needs, preferences, and priorities in order to optimize the dispatch of the elevators in a building (step 606). In addition to user traffic already in line, the dispatching model also considers predicted traffic in the near future, compared with the current position and speed of the elevators, user features, and user preference data. These features are added into the system as new dimensions, and the dispatching model can be based on a neural network or deep machine learning algorithm to find optimized weights for each dimension.

The elevators in the building are then dispatched according to the model (step 608). Both direct and indirect feedback are collected from users over a predetermined time period of operation (step 610), and the updated data is fed back to update and refine the predictive dispatch model. In a reinforcement learning environment, user feedback is collected as real-time scores of the dispatching system. Positive feedback is taken as a reward of the system, and negative feedback is taken as a punish of the system. The dispatching model can re-fine dynamically to hit global optimization.

Figure 7:
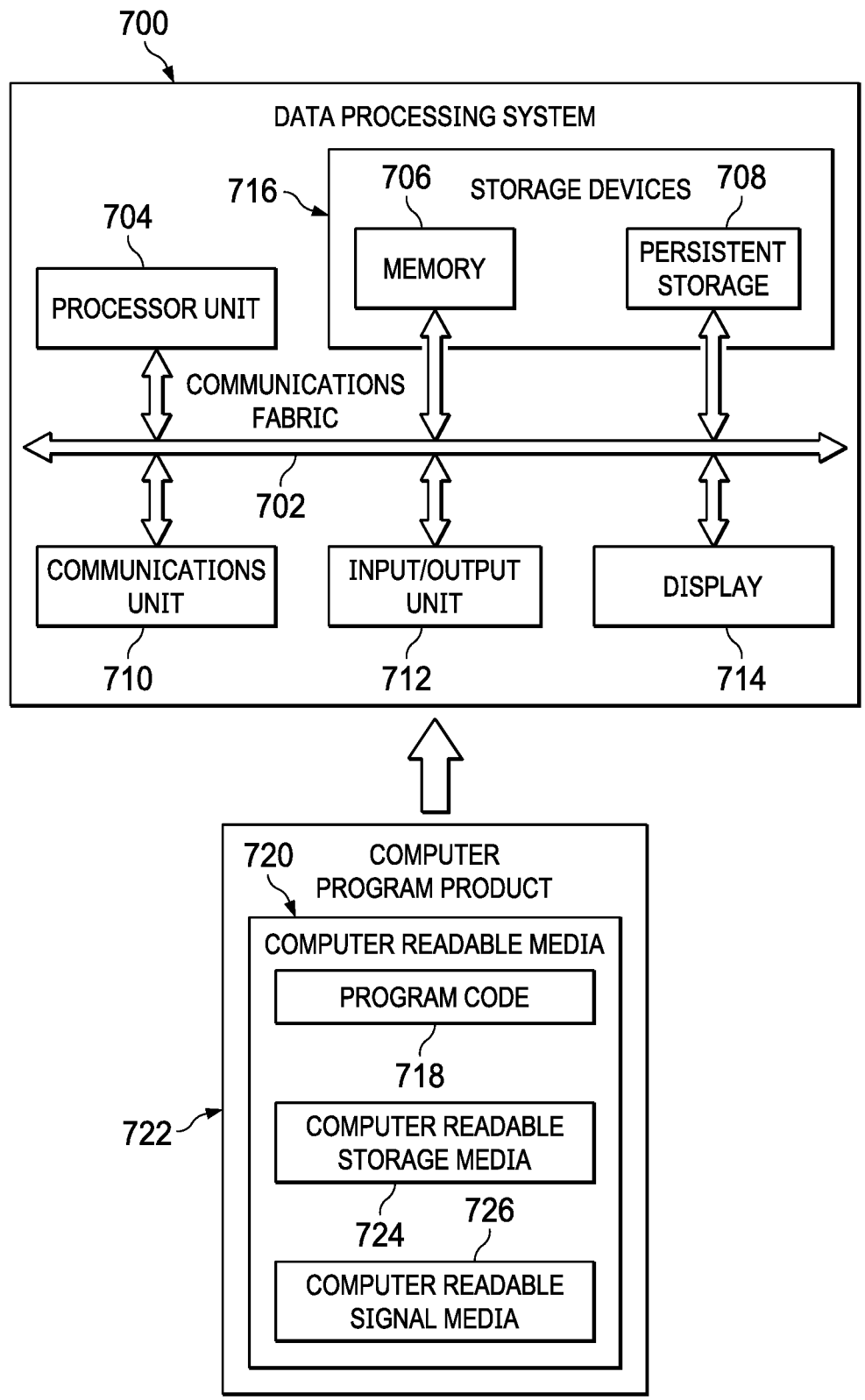
FIG. 7 is a diagram of a data processing system is depicted in accordance with an illustrative embodiment.

Turning to FIG. 7, a diagram of a data processing system is depicted in accordance with an illustrative embodiment. Data processing system 700 is an example of a system in which computer-readable program code or program instructions implementing processes of illustrative embodiments may be run. Data processing system 700 may be an example of one system in which root cause analysis system 116 in FIG. 1 may be implemented. In this illustrative example, data processing system 700 includes communications fabric 702, which provides communications between processor unit 704, memory 706, persistent storage 708, communications unit 710, input/output unit 712, and display 714.

Processor unit 704 serves to execute instructions for software applications and programs that may be loaded into memory 706. Processor unit 704 may be a set of one or more hardware processor devices or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 706, in these examples, may be, for example, a random access memory, or any other suitable volatile or non-volatile storage device. Persistent storage 708 may take various forms, depending on the particular implementation. For example, persistent storage 708 may contain one or more devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in this example, provides for communication with other computers, data processing systems, and devices via network communications unit 710 may provide communications using both physical and wireless communications links. The physical communications link may utilize, for example, a wire, cable, universal serial bus, or any other physical technology to establish a physical communications link for data processing system 700. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 700.

Input/output unit 712 allows for the input and output of data with other devices that may be connected to data processing system 700. For example, input/output unit 712 may provide a connection for user input through a keypad, keyboard, and/or some other suitable input device. Display 714 provides a mechanism to display information to a user and may include touch screen capabilities to allow the user to make on-screen selections through user interfaces or input data, for example.

Instructions for the operating system, applications, and/or programs may be located in storage devices 716, which are in communication with processor unit 704 through communications fabric 702. In this illustrative example, the instructions are in a functional form on persistent storage 708. These instructions may be loaded into memory 706 for running by processor unit 704. The processes of the different embodiments may be performed by processor unit 704 using computer-implemented program instructions, which may be located in a memory, such as memory 706. These program instructions are referred to as program code, computer-usable program code, or computer-readable program code that may be read and run by a processor in processor unit 704. The program code, in the different embodiments, may be embodied on different physical computer-readable storage devices, such as memory 706 or persistent storage 708.

Program code 718 is located in a functional form on computer-readable media 720 that is selectively removable and may be loaded onto or transferred to data processing system 700 for running by processor unit 704. Program code 718 and computer-readable media 720 form computer program product 722. In one example, computer-readable media 720 may be computer-readable storage media 724 or computer-readable signal media 726. Computer-readable storage media 724 may include, for example, an optical or magnetic disc that is inserted or placed into a drive or other device that is part of persistent storage 708 for transfer onto a storage device, such as a hard drive, that is part of persistent storage 708. Computer-readable storage media 724 also may take the form of a persistent storage, such as a hard drive, a thumb drive, or a flash memory that is connected to data processing system 700. In some instances, computer-readable storage media 724 may not be removable from data processing system 700.

Alternatively, program code 718 may be transferred to data processing system 900 using computer-readable signal media 726. Computer-readable signal media 726 may be, for example, a propagated data signal containing program code 718. For example, computer-readable signal media 726 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 718 may be downloaded over a network to persistent storage 708 from another device or data processing system through computer-readable signal media 726 for use within data processing system 700. For instance, program code stored in a computer-readable storage media in a data processing system may be downloaded over a network from the data processing system to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to, or in place of, those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a computer-readable storage device in data processing system 700 is any hardware apparatus that may store data. Memory 706, persistent storage 708, and computer-readable storage media 724 are examples of physical storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The descriptions provided herein are not intended to encompass all of the steps that may be used to form a functional integrated circuit device. Certain steps that are commonly used in fabricating such devices are purposefully not described herein for economy of description.

The flowchart and diagrams in the figures illustrate the method and resulting architecture according to embodiments of the present disclosure. In this regard, each block in the flowchart or structural diagrams may represent a step or partial step, which comprise one or more procedures for implementing the illustrative embodiments. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of controlling elevator dispatch, comprising:
   collecting, by a number of input devices, user data from a number of users, wherein the user data includes user behavior over a specified time period;
   collecting, by an elevator control system, elevator use data for a number of elevators in a building over the specified time period;
   constructing, by a number of processors applying the user data and elevator use data, an elevator dispatch model that predicts future elevator use according to predicted user needs;
   dispatching, by the elevator control system, the elevators according to the dispatch model; and
   refining, by a number of processors, the elevator dispatch model according to feedback data collected from users over a subsequent time period.

2. The method of claim 1, wherein the feedback data comprises feedback provided directly by users.

3. The method of claim 1, wherein the feedback data comprises indirect feedback extrapolated from user behavior.

4. The method of claim 1, wherein the elevator dispatch model is constructed using at least one of:
   a neural network; and
   a machine learning algorithm.

5. The method of claim 1, wherein the user data collected by the number of input devices is communicated to the elevator control system via a local area network, and the user data further comprises at least one of:
   objects to be transported by the user;
   predicted departure from the building;
   predicted arrival at the building;
   urgency of elevator use; and
   sensitivity to ambient noise.

6. The method of claim 5, wherein the input devices include at least one of:
   mobile telephone;
   mobile application;
   and
   internet enabled appliances.

7. The method of claim 1, wherein the elevator dispatch model is constructed and refined using the following factors:
   predicted elevator traffic;
   predicted intent of elevator trip;
   user preference;
   user feedback;
   user personal information;
   real-time user behavior;
   real-time elevator use data; and
   historical elevator use data.

8. A system for controlling elevator dispatch, comprising:
   an elevator control system configured to control movements of a number of elevators in a building and collect data about elevator use;
   a bus system in communication with the elevator control system;
   an input system connected to the bus system, wherein the input system is configured to receive data from a number of input devices;
   a storage device connected to the bus system, wherein the storage device is configured to store input data and program instructions; and
   a number of processors connected to the bus system, wherein the processors execute the program instructions to:
      collect user data provided by the input system about a number of users, wherein the user data includes user behavior over a specified time period;
      collect elevator use data for the elevators in the building over the specified time period;
      construct, by applying the user data and elevator use data, an elevator dispatch model that predicts future elevator use according to predicted user needs;
      dispatch the elevators in the building according to the dispatch model; and
      refine the elevator dispatch model according to user feedback data provided by the input system over a subsequent time period.

9. The system of claim 8, wherein the feedback data comprises feedback provided directly by users and indirect feedback extrapolated from user behavior.

10. The system of claim 8, wherein the elevator dispatch model is constructed using at least one of:
    a neural network; and
    a machine learning algorithm.

11. The system of claim 8, wherein the user data collected by the number of input devices is communicated to the elevator control system via a local area network, and the user data further comprises at least one of:
    objects to be transported by the user;
    predicted departure from the building;
    predicted arrival at the building;
    urgency of elevator use; and
    sensitivity to ambient noise.

12. The system of claim 11, wherein the input devices include at least one of:
    mobile telephone;
    mobile application;
    and
    internet enabled appliances.

13. The system of claim 8, wherein the elevator dispatch model is constructed and refined using the following factors:
    predicted elevator traffic;
    predicted intent of elevator trip;
    user preference;
    user feedback;
    user personal information;
    real-time user behavior;
    real-time elevator use data; and
    historical elevator use data.

14. A computer program product for controlling elevator dispatch, comprising, the computer program product comprising a non-volatile computer readable storage medium having program instructions embodied therewith, the program instructions executable by a computer to cause the computer to perform the steps of:
- collecting user data from a number of users, wherein the user data includes user behavior;
- collecting elevator use data for a number of elevators in a building over the specified time period;
- constructing, by applying the user data and elevator use data, an elevator dispatch model that predicts future elevator use according to predicted user needs;
- dispatching the elevators according to the dispatch model; and
- refining the elevator dispatch model according to feedback data collected from users over a subsequent time period.

15. The computer program product of claim 14, wherein the feedback data comprises feedback provided directly by users.

16. The computer program product of claim 14, wherein the feedback data comprises indirect feedback extrapolated from user behavior over a specified period of time.

17. The computer program product of claim 14, wherein the elevator dispatch model is constructed using at least one of:
- a neural network; and
- a machine learning algorithm.

18. The computer program product of claim 14, wherein the user data collected by the number of input devices is communicated to the elevator control system via a local area network, and the user data further comprises at least one of:
- objects to be transported by the user;
- predicted departure from the building;
- predicted arrival at the building;
- urgency of elevator use; and
- sensitivity to ambient noise.

19. The computer product of claim 18, wherein the input devices include at least one of:
- mobile telephone;
- mobile application; and
- internet enabled appliances.

20. The computer program product of claim 14, wherein the elevator dispatch model is constructed and refined using the following factors:
- predicted elevator traffic;
- predicted intent of elevator trip;
- user preference;
- user feedback;
- user personal information;
- real-time user behavior;
- real-time elevator use data; and
- historical elevator use data.

* * * * *